(12) United States Patent
Lanni (10) Patent No.: US 6,850,423 B2
(45) Date of Patent: Feb. 1, 2005

(54) COMMON MODE NOISE CANCELLATION CIRCUIT (75) Inventor: Thomas W. Lanni, Laguna Niguel, CA (US)

(73) Assignee: Comarco Wireless Technologies, Inc., Irvine, CA (US)

(*) Notice: Subject to any disclaimer, the term of this patent is extended or adjusted under 35 U.S.C. 154(b) by 6 days.

(21) Appl. No.: 10/452,162

(22) Filed: May 30, 2003

(65) Prior Publication Data

US 2004/0240236 A1 Dec. 2, 2004

(51) Int. Cl.[7] .............................................. H02M 3/335
(52) U.S. Cl. .................................. 363/21.04; 363/21.08
(58) Field of Search ........................... 363/21.04, 21.08, 363/21.09, 24, 25

(56) References Cited

U.S. PATENT DOCUMENTS 6,449,176 B1 * 9/2002 Kakuda ........................ 363/91
6,459,597 B1 * 10/2002 Igarashi et al. ............... 363/29
6,490,181 B1 * 12/2002 Liu et al. ...................... 363/40
6,717,827 B2 * 4/2004 Ota ........................... 363/21.12

* cited by examiner

Primary Examiner—Bao Q. Vu
(74) Attorney, Agent, or Firm—Pillsbury Winthrop LLP (57) ABSTRACT A common mode noise cancellation circuit eliminates common mode noise generated by one or more high-frequency switching devices. A common mode noise waveform generated by the one or ore switching devices is capacitively coupled from the primary winding to the first secondary winding of a transformer. A set of cancellation secondary windings generates a common mode cancellation waveform, and cancels the common mode noise waveform because the common mode cancellation waveform is approximately equal in amplitude and opposite in phase to the common mode noise waveform. A triac control circuit receives an AC input and determines whether the AC input is within a range where multiplying of the DC voltage is implemented. If the triac control circuit determines the AC input is within the range, the triac control circuit transmits a triac firing signal to the triac circuit. The triac circuit charges a capacitor bank to multiply the DC voltage.

23 Claims, 5 Drawing Sheets

COMMON MODE NOISE CANCELLATION CIRCUIT

BACKGROUND

1. Technical Field

This invention relates to power conversion. More specifically, this invention relates to the cancellation of a common mode noise waveform.

2. Discussion of the Related Art

In a simple AC power distribution system, there are three wires in a cord connecting, for example, a computer to a wall socket, which distributes the AC power. There is an active wire, a neutral wire, and a ground wire. Common mode noise is present on both the active and neutral wires and may be measured with respect to ground, the term common refers to the fact that identical noise appears on both the active and neutral wires. In some situations, common mode noise may be created by lightning, circuit breakers switching, poor grounding, or use of surge protectors that divert noise from the neutral wires. In high-frequency switching mode power supplies, common mode noise is created by the high frequency switching device within the power supply.

Common mode noise presents a problem because the common mode noise attempts to dissipate its energy from neutral to ground or from active to ground. In switching-mode power supplies, common-mode noise may be coupled through a high-frequency transformer or along paths that have stray or parasitic capacitance. Under certain conditions, especially if the common-mode noise consists of high frequency impulses, there is a probability that the noise will see the high frequency transformer as a coupling capacitor and pass through the transformer unobstructed. The power supply may also act like a high-frequency radio antenna, which may result in the power supply not meeting electromagnetic interference (EMI) standards. In addition, in small form power supplies, more stray capacitance paths may exist simply because they are smaller in physical size and more densely packaged when compared to other power supplies.

If common mode noise is transferred through a switching-mode power supply, a noise voltage appears between the ground and the voltage-supply pins of the device being powered. If the noise exceeds the maximum voltage specification of the device being powered, the energy from the common mode noise may pass through the logic hardware to ground, dissipating energy along the way. Reduced reliability, interference with data processing, and permanent damage may result. The magnitude of the common-mode noise does not need to be high to cause damage because electronics components in the device being powered may be able to withstand only a few volts or a few tens of milliamperes of current.

DETAILED DESCRIPTION

Figure 1:
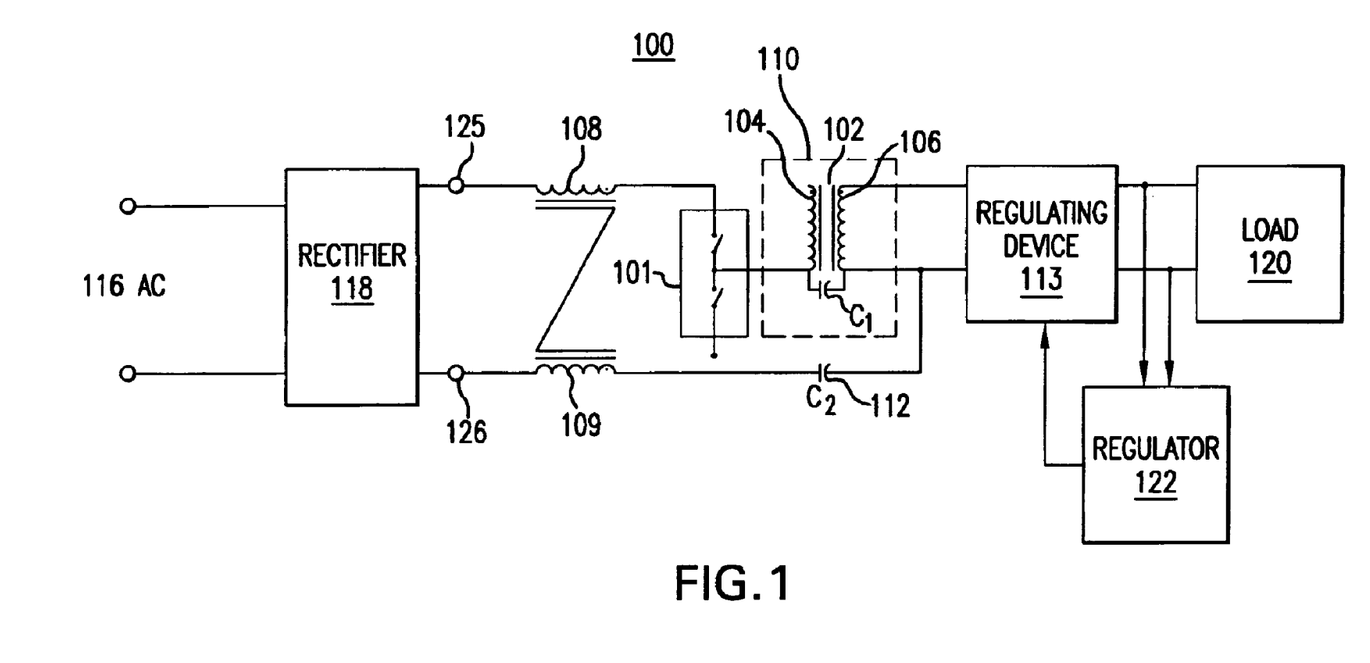
FIG. 1 illustrates an AC to DC power supply utilizing a noise cancellation circuit according to an embodiment of the present invention.

FIG. 1 illustrates an AC to DC power supply utilizing a noise cancellation circuit according to an embodiment of the present invention. The AC to DC power supply 100 may include an AC input 116, a rectifier 118, a switching device 101, a transformer 102, a set of cancellation secondary windings 108 and 109, a regulating device 113, a regulator 122, and an output load 120. The transformer 102 may include a primary winding 104 and a first secondary winding 106. The transformer 102 may include an inherent parasitic capacitance, i.e., $C_1$, 110 representatively coupled between the primary winding 104 and the first secondary winding 106. In an embodiment of the invention, the AC to DC power supply 100 may also include a capacitor 112 which is coupled between the secondary winding 106, the switching device 101, and one of the set of cancellation secondary windings 109.

Generally, the operation of the AC to DC power supply is as follows. The rectifier 118 may receive an AC input voltage from the AC input 116. The rectifier 118 may output a DC voltage. The switching device 101 may receive the DC input and produce a switched output. In embodiments of the invention, the AC to DC power supply may include one or more switching devices 101, depending on the configuration or design of the AC to DC power supply. For simplicity, the remainder of the application illustrates only a single switching device. The switching device 101 may also create a common mode noise waveform because of the high frequency operation of the switching device 101. The common mode noise waveform may be any shape waveform, e.g., a sqaurewave. The primary winding 104 of the transformer 102 may receive the switched output and the common mode noise waveform. The switched output may be transferred to the first secondary winding 106 and produce a transformed output. The transformed output may be input into a regulating device 113 which produces a regulated DC output. The regulated DC output, Vout, may be transferred to the load 120. A voltage regulator 122 may tap off the regulated DC output to verify that the regulated DC output is operating within a specified range. If the regulated DC output is not operating within the specified range, the voltage regulator 122 may transmit a correction signal to the regulating device 113 to modify the magnitude of the regulated DC output. The voltage regulator 122 may also receive a programming voltage or a programming current. The regulator 122 may verify that the regulated DC output is operating within an established ratio of regulated DC output to the programming voltage or the programming current. If the regulated DC output is not operating within the established ratio, the voltage regulator 122 may transmit a correction signal to the regulating device 113 to modify the magnitude of the regulated DC output.

The common mode noise waveform created by the high frequency switching device 101 may be capacitively coupled via parasitic capacitance 110 from the primary winding 104 to the first secondary winding 106. As discussed, the common mode noise waveform may cause the AC to DC power supply to act like a radio antenna and transmit common mode noise to the load 120. Thus, it is important to minimize or eliminate the common mode noise waveform. Although the parasitic capacitance is not embodied in a physical device, it is a real component of a transformer 102 and is represented as $C_1$ 110 in FIG. 1. The turns ratio of the primary winding 104 to the first secondary winding 106 may not determine the magnitude of the common mode noise waveform because the common mode noise waveform is capacitively coupled from the primary winding 104 to the first secondary winding 106. In other words, the magnitude of the common mode noise waveform on the primary winding 104 is approximately the same value as the magnitude of the common mode noise waveform on the first secondary winding 106 because it is not reduced by the turns ratio of the primary-to-secondary windings. Instead, the common mode noise waveform is directly coupled fir the primary winding 104 via the inherent parasitic capacitance 110 to the first secondary winding 106 at the same magnitude.

The set of cancellation secondary windings 108 and 109 may introduce a common mode cancellation waveform to cancel out the common mode noise waveform created by the switching device 101. In an embodiment of the invention, as illustrated in FIG. 1, the set of cancellation secondary windings 108 and 109 may be placed on the primary side of the transformer 102. In an embodiment of the invention, the set of cancellation secondary windings may be placed on the secondary side of the transformer 102, meaning of the side of the transformer 102 that includes the regulating device 113. The set of cancellation secondary windings may include two or more cancellation secondary windings. For simplicity, in the remainder of the application, the set of cancellation secondary windings are only illustrated on the primary side of the transformer 102.

As indicated by the placement of the dot in the set of cancellation secondary windings 108 and 109 in FIG. 1, the set of cancellation secondary windings 108 and 109 may be wound opposite in phase to the primary winding 104 and the first secondary winding 106. In other words, the set of cancellation secondary windings 108 and 109 are coiled in an opposite direction around the magnetic core of the transformer 102 as compared to the primary winding 104 and the first secondary winding 106.

The set of cancellation secondary windings 108 and 109 may be coupled between the DC voltage output from the rectifier 118 and the switching device 101. The set of cancellation secondary windings 108 and 109 may be wired in a common mode configuration. One of the set of cancellation secondary windings 108 may be coupled in series between a DC voltage reference terminal 125 and one terminal of the switching device 101. Another of the set of cancellation secondary windings 109 may be coupled in series between another DC voltage reference terminal 126 and another terminal of the switching device 101.

The common mode cancellation waveform may be approximately equal in amplitude to the common mode noise waveform but the common mode cancellation waveform is opposite in phase, which creates the cancellation effect versus the common mode noise waveform. Under certain operating conditions, the magnitude of the common mode cancellation waveform may be equivalent to the magnitude of the common mode noise waveform. The magnitude of the common mode cancellation waveform may be equivalent because the number of turns of each of the set of cancellation secondary windings 108 may be equal to the number of turns of the primary winding 104 of the transformer 102. In other words, if the primary winding 104 has N turns, each of the set of cancellation secondary windings 108 has N turns. For example, the switching device 101 may generate a common mode noise waveform having a magnitude of 30 volts onto the primary winding 104 of the transformer 102. The primary winding 104 may have N, e.g., 4, turns. In order to cancel out the common mode noise waveform, each of the set of cancellation secondary windings 108 may have the same number of turns, e.g., 4 turns, which will produce a common mode cancellation waveform of 30 volts that is opposite in phase to the common mode noise waveform and cancels out the common mode noise waveform. The introduction of the common mode cancellation waveform may prevent the AC to DC power supply 100 from transmitting the common mode noise to the load 120.

Figure 2:
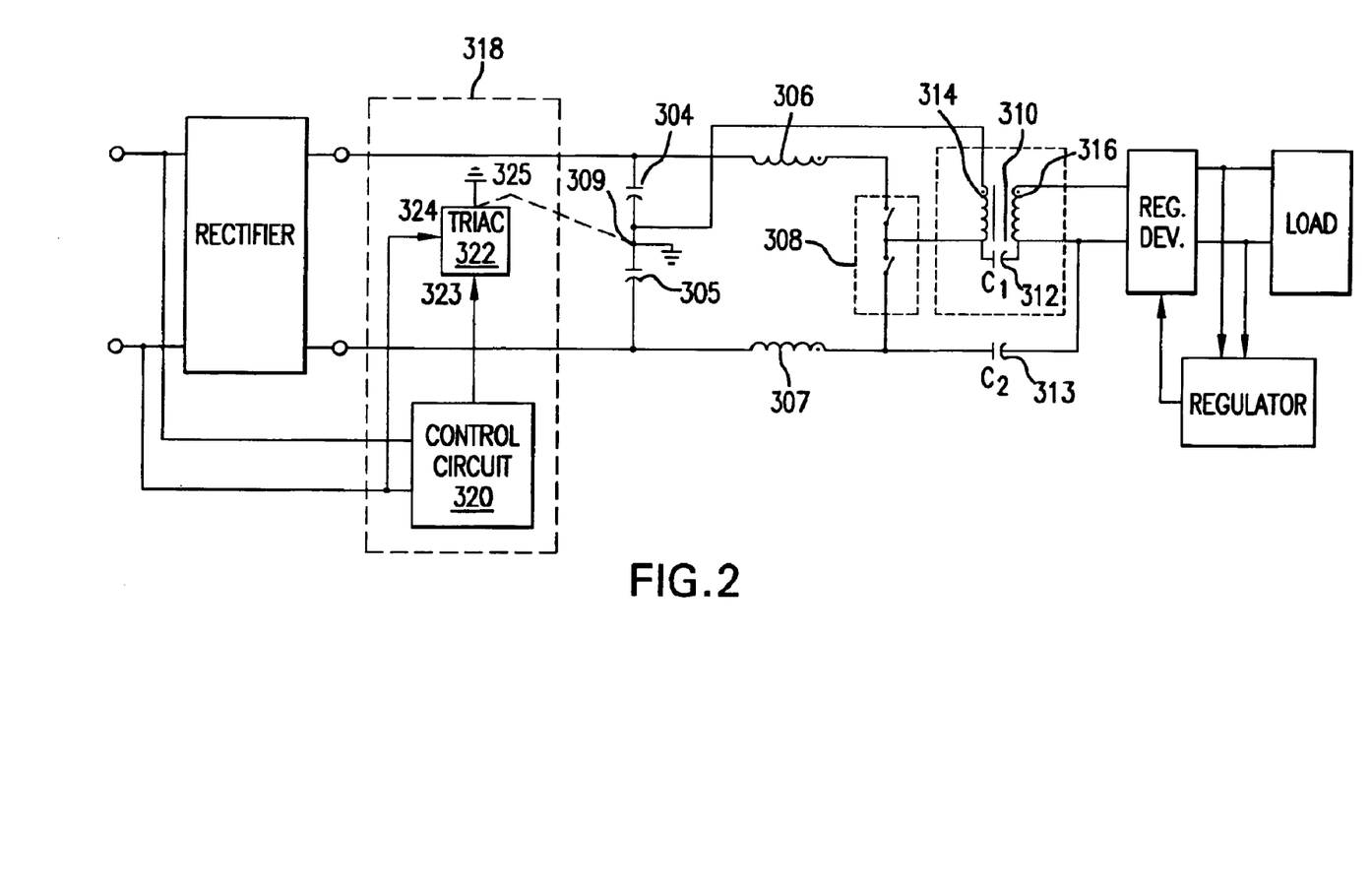
FIG. 2 illustrates an embodiment of the noise cancellation circuit including a triac-enabled multiplying circuit according to an embodiment of the present invention.

FIG. 2 illustrates an embodiment of the noise cancellation circuit including a triac-enabled multiplying circuit according to an embodiment of the present invention. The triac-enabled multiplying circuit may enhance, e.g., double or triple, the DC voltage of the circuit when the AC voltage is operating within a specified voltage range, e.g., from 85 volts to 130 volts. In other words, the AC input voltage must be above a low threshold voltage, e.g., 85 volts, and must be below a high threshold voltage, e.g., 130 volts. For simplicity, in the remainder of the application, the triac-enabled multiplying circuit may be illustrated as a triac-enabled doubling circuit.

The triac noise cancellation circuit 300 may includes a pair of capacitors 304 and 305, a set of cancellation secondary windings 306 and 307, a switching device 308, a transformer 310, a representative parasitic capacitance 312, and a capacitor 313. The transformer 310 includes a primary winding 314 and a first secondary winding 316. The noise cancellation portion of the triac noise cancellation circuit 300 operates in the same fashion as described above with regards to FIG. 1.

The triac portion of the triac noise cancellation circuit 300 includes a low-loss, low-noise triac-enabled multiplying circuit 318. The low-loss, low electromagnetic interference (EMI) noise triac-enabled doubling circuit 318 includes a triac control circuit 320 and a triac circuit 322.

The triac circuit 322 includes a gate terminal 323, a first anode 324, and a second anode 325. The triac control circuit 320 provides a DC firing signal to a gate terminal 323 of the triac circuit 322 to enable, i.e., fire, the triac circuit 322. The triac 322 is enabled when approximately zero volts are present across the triac 322. Because the triac is enabled at approximately zero volts, the electromagnetic interference (EMI) noise is reduced. The turning on of the gate terminal of the triac circuit enables a connection of the AC line to the capacitor bank, which includes capacitors 304 and 305. The connection is enabled because a center node of the capacitor bank, illustrated as node 309 in FIG. 2, is coupled to ground as is the second anode 325 of the triac circuit 322 (second anode 325 and node 309 are illustrated connected via the dotted line in FIG. 2). Thus, the triac circuit 322 charges up one of the pair of capacitors 304 on the positive cycle of the AC input and charges the other capacitor 305 on the negative cycle of the AC input. This produces a doubling of the DC input voltage.

If the AC input is not within the range requiring doubling, then the DC triac firing signal is not transmitted by the triac control circuit 320. The DC voltage is impressed across capacitors 304 and 305, which are coupled in series. Thus, the DC voltage output from the rectifier is not multiplied, e.g., doubled.

Figure 3:
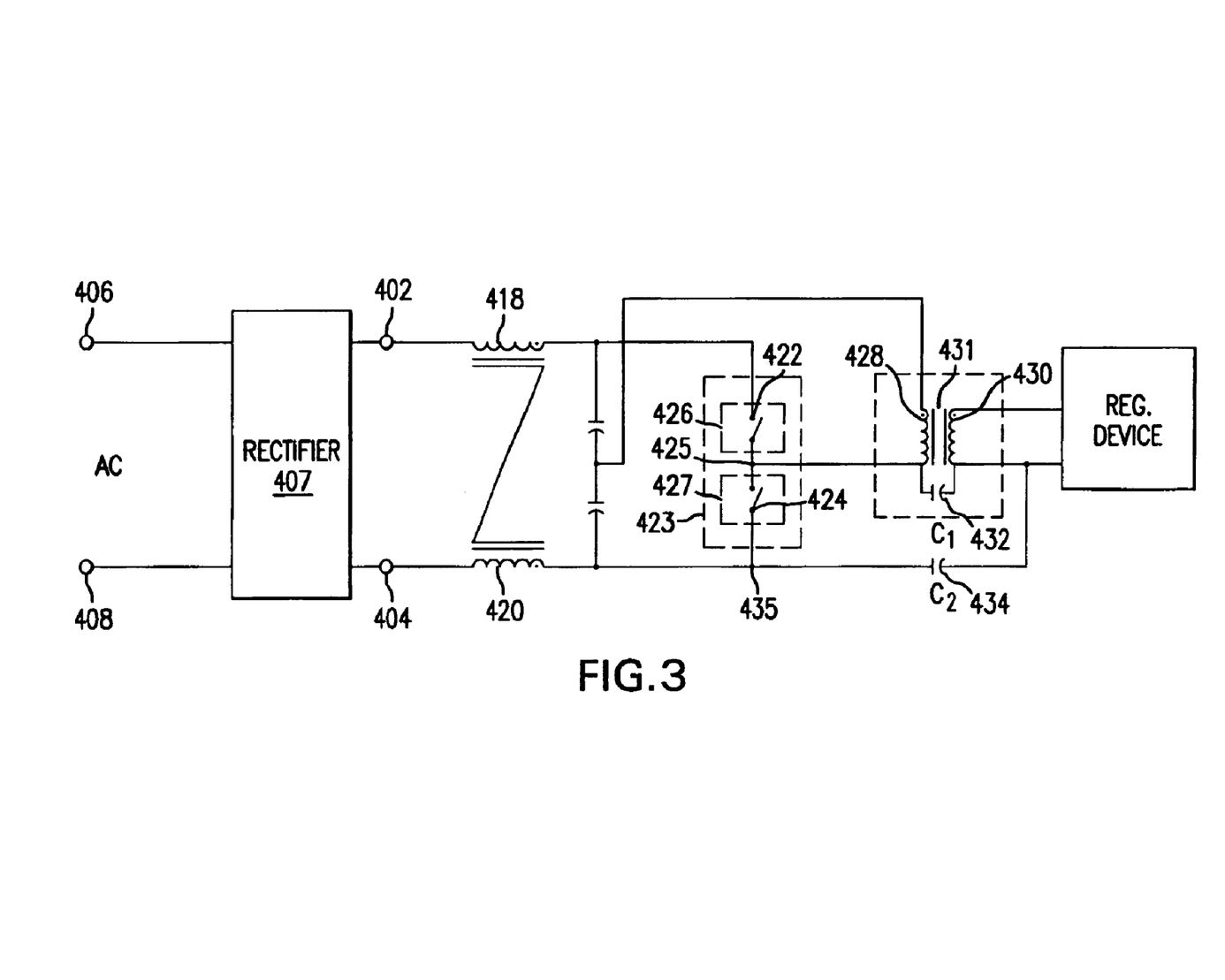
FIG. 3 illustrates a detailed noise cancellation circuit including a turns reducing capacitor according to an embodiment of the present invention.

FIG. 3 illustrates a detailed noise cancellation circuit including a turns reducing capacitor according to an embodiment of the present invention. The noise cancellation circuit is located with an AC to DC power supply and operation of the AC to DC power supply is the same as discussed with regards to FIG. 1. A pair of AC input terminals 406 and 408 provide an AC input to a rectifier 407. The rectifier 407 provides a DC voltage at terminals 402 and 404. The DC terminal 402 may be coupled to a terminal of a first cancellation secondary winding 418. A second DC terminal 404 may be coupled to a terminal of a second cancellation secondary winding 420.

The first cancellation secondary winding 418 may also be coupled to a terminal 422 of a first switch 426 of a switching device 423. The second cancellation secondary winding 420 may be coupled to a second terminal 424 of a second switch 427 in the switching device 423. A node 425 as defined by the junction between a second terminal of the first switch 426 and a first terminal of the second switch 427 may be coupled to a terminal of the primary winding 428 of the transformer 431. The first cancellation secondary winding 418 and the second cancellation secondary winding 420 may be wired in a common mode configuration.

The primary winding 428 of the transformer 431 may be magnetically coupled to the first secondary winding 430 of the transformer 431. A parasitic capacitance 432, illustrated as C1, may be inherent in the transformer 431 and may be represented as coupled between the primary winding 428 and the first secondary winding 430. In addition, a capacitor 434, illustrated as C2, may be coupled between the first secondary winding 430 and node 435, where node 435 is defined by the junction of the second terminal 424 of the second switch 427 of the switching device 423 and the cancellation secondary winding 420.

The DC input voltage may be input to the switching device 423. The switching device 423 creates a switched voltage that is input to the primary winding 428 of the transformer 431. The switched voltage is magnetically coupled from the primary winding 428 to the first secondary winding 430 to create a transformed voltage. A common mode noise waveform may also be created by the high-frequency switching device 423. Illustratively, the common mode noise waveform may be a square wave that has an amplitude of N volts. The common mode noise waveform may be capacitively coupled from the primary winding 428 to the first secondary winding 430 via the inherent parasitic capacitance 432. The common mode waveform capacitively coupled to the first secondary winding 430 may equal N volts and may not depend on the turns ratio of the primary winding 428 versus the first secondary winding 430 because it is capacitively coupled to the first secondary winding 430 and not induced across the magnetic core.

The common mode cancellation waveform may be introduced via the set of cancellation secondary windings 418 and 420. The capacitor 434 may reduce the number of turns needed by the set of cancellation secondary windings, and may be referred to as a turns reducing capacitor 434. The capacitor 434 may be coupled between the first secondary winding 430 of the transformer 431 and node 435, where node 435 is defined by the junction of a second terminal 424 of the second switch 427 of the switching device 423 and a terminal of the second cancellation secondary winding 420.

The magnitude of the common mode noise waveform across the capacitor 434 may be equal to the original common mode noise waveform magnitude, i.e., Vn, multiplied by (Ctotal)/(C2). Ctotal is determined by the equation of 1/((1/C1)+(1/C2)). For example, if Vn is equal to 100 volts, the value of C1, i.e., the parasitic capacitance, is 100 picofarads, and the value of C2 is 900 picofarads, then the magnitude of the common mode noise waveform across the capacitor 434 may be equal to 10 volts. Illustratively, 1/C1+1/C2=10/900 and 1/(10/900)=90 (or 900 over 10). Thus, the magnitude of the common mode noise waveform is equal to 100·(90/900)=10.

The magnitude of the common mode cancellation waveform introduced by the set of cancellation windings may be determined by the equation Vn×(Ncancellation/Nprimary). Because the goal of the introduction of the common mode cancellation waveform is to eliminate the common mode noise waveform, the equations may be set to equal each other, i.e., Vn×(Ctotal/C2)=Vn×(Ncancellation/Nprimary). Because Vn is common to both sides of the equation, it may be cancelled out. The equation thus becomes (Ncancellation/Nprimary)=Ctotal/C2. Illustratively, if Nprimary=30 turns and (Ctotal/C2)=1/10, then Ncancellation=30×(1/10), or 3. Thus, Ncancellation is equal to 3 turns, which would be a significant reduction from the 30 turns needed if the turns reducing capacitor 434 was not installed.

The utilization of the set of cancellation secondary windings 418 and 420 allows for the current that is supplying the triac noise cancellation circuit to cancel itself out. If only one cancellation secondary winding was involved, the voltage gets introduced back into the triac noise cancellation circuit. The use of the set of cancellation secondary windings 418 and 420 allows the positive and negative supply line to be moved at the same time. The load current may flow from the first cancellation secondary winding 418 to the switching device 423 to the second cancellation secondary winding 420. Because the load current enters at the negative polarity of the first cancellation secondary winding 418, exits the positive polarity of the first cancellation secondary winding 418, enters the positive polarity of the second cancellation winding 420, and exits out the negative polarity of the second cancellation winding 420, the current cancels itself out. In other words, the magnetic field impressed on the core of the transformer 426 is zero. The transformer does not receive the current being transmitted between the first cancellation secondary winding 418 and the second cancellation secondary winding 420. The transformer 431 does not even sense that the first cancellation secondary winding 418 and the second cancellation secondary winding 420 are connected.

Figure 4:
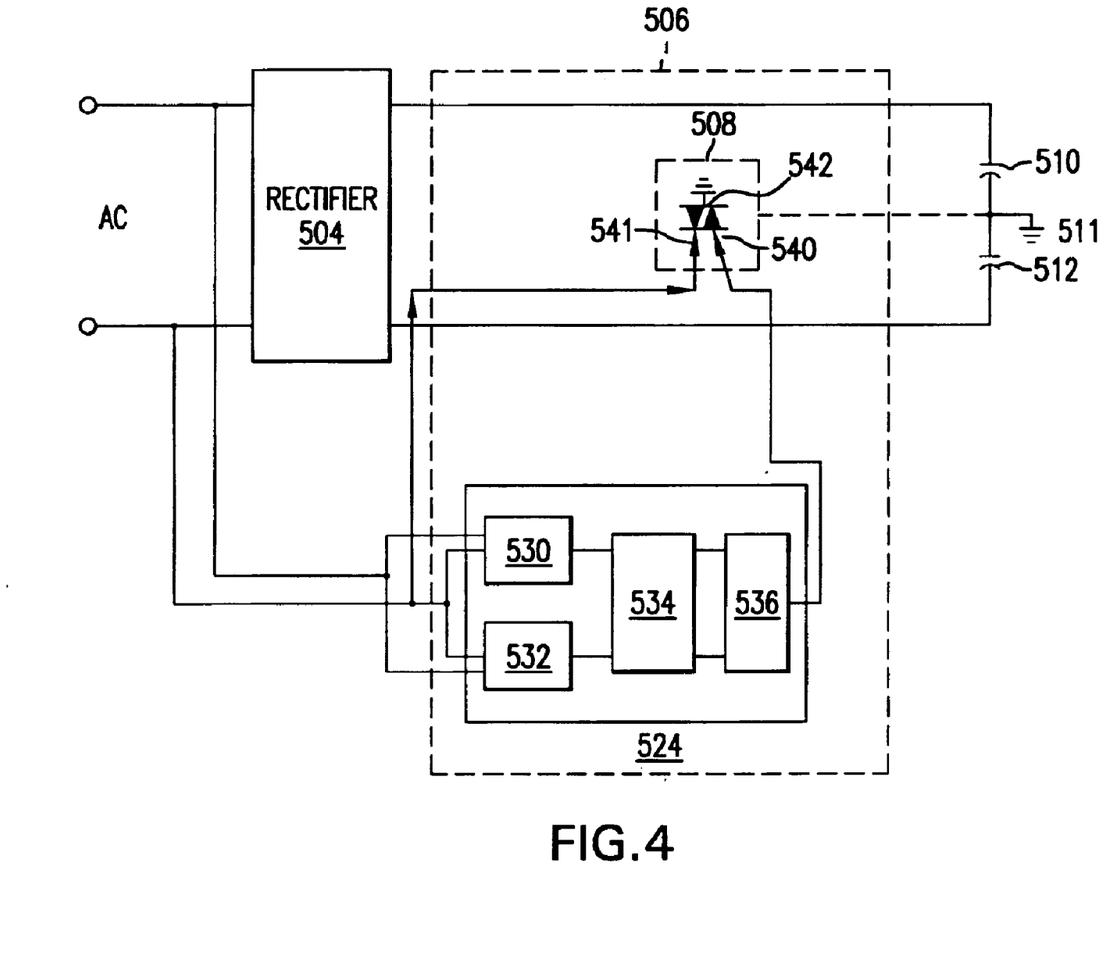
FIG. 4 illustrates a detailed triac-enabled multiplying circuit according to an embodiment of the present invention.

FIG. 4 illustrates a detailed triac-enabled multiplying circuit according to an embodiment of the present invention. An external AC input source, e.g., a wall socket, may output an AC input voltage. A voltage rectifier 504 may receive the AC input voltage and may output a DC voltage. In an embodiment of the invention where the multiplying circuit is a doubling circuit, the doubling circuit 506 may double a value of the DC voltage if the AC input voltage is within a specified doubling range, ire., if the AC input voltage is above a low threshold voltage and below a high threshold voltage. For example, the doubling circuit 506 may double the value of the DC voltage if the AC input voltage has a peak voltage from 85 volts AC to 140 volts AC. Illustratively, the triac-enabled doubling circuit 506 may include a triac control circuit 524 and a triac circuit 508. A second anode 542 of the triac-enabled doubling circuit 506 may be coupled to node 511, which is defined as the junction between a first capacitor 510 and a second capacitor 512, because both node 511 and the second anode 542 of the triac-enabled doubling circuit are coupled to a reference potential.

The triac control circuit 524 may include a low-side voltage sense circuit 530, a high-side voltage sense circuit 532, an integrator 534, and a comparator circuit 536. The low-side voltage sense circuit 530 may receive the AC input voltage. The low-side voltage sense circuit 530 may determine if the AC input voltage is a greater than a low threshold voltage. The low-side voltage sense circuit 530 may output a low activation signal, if the AC input voltage is greater than the low threshold voltage. For example, if the low threshold voltage is 85 volts, the low-side voltage sense circuit 530 may output the low activation signal if the external input voltage is greater than 85 volts. In one embodiment of the invention, the low-side voltage sense circuit 530 may be implemented utilizing a comparator. The comparator may measure the AC input voltage to determine if it is greater than the low threshold value.

A high-end voltage sense circuit 532 may receive the AC input voltage. The high-end voltage sense circuit 532 may determine if the AC input voltage is lower than a high threshold voltage. If the high-end voltage sense circuit 532 determines the AC input voltage is lower than the high threshold voltage, then a high activation signal is output from the high-end voltage sense circuit 532. In one embodiment of the invention, the high-end voltage sense circuit 532 may be implemented utilizing a comparator to compare the AC input voltage with the high threshold voltage.

An integrator 534 may receive the low activation signal and the high activation signal from the low-side voltage sense circuit 530 and the high-side voltage sense circuit 532, respectively. If the integrator 534 determines that the low activation signal and the high activation signal exist for a number of time periods, the integrator 534 outputs an intermediate signal. In one embodiment of the invention, the integrator 534 may be implemented utilizing a resistor and a capacitor.

A threshold comparator circuit 536 may receive the intermediate signal. The threshold comparator circuit 536 may output a triac fire signal when a threshold measurement is reached. In the embodiment of the invention, the triac fire signal may be output from the threshold comparator circuit when a zero, i.e., 0 volt, measurement is reached.

The triac circuit 508 may receive the triac fire signal at a gate terminal 540 of the triac circuit 508. The first anode 541 of the triac circuit 508 may be coupled to a terminal of the AC line. A second anode 542 of the triac circuit 508 may be coupled to a reference potential, e.g., ground. The triac 508 is enabled when approximately zero volts are present across the triac 322. Because the triac 508 is enabled at approximately zero volts, the electromagnetic interference (EMI) noise is reduced. The receiving of the triac fire signal at the gate terminal 540 may enable a connection between the first anode 541 of the triac circuit 508 and the second anode 542 of the triac circuit 508. In other words, the AC line to be connected to a reference potential. Because node 511 is also connected to the reference potential, this may allow the AC line to be coupled to node 511, which is located in the middle of the capacitor bank formed by capacitor 510 and capacitor 512. Thus, the firing of triac circuit 508 may charge capacitor 510 on the positive cycle of the AC input (because the AC line is coupled to node 511) and the firing of the triac 508 may charge capacitor 512 on the negative cycle of the AC input (also because the AC line is coupled to node 511).

Figure 5:
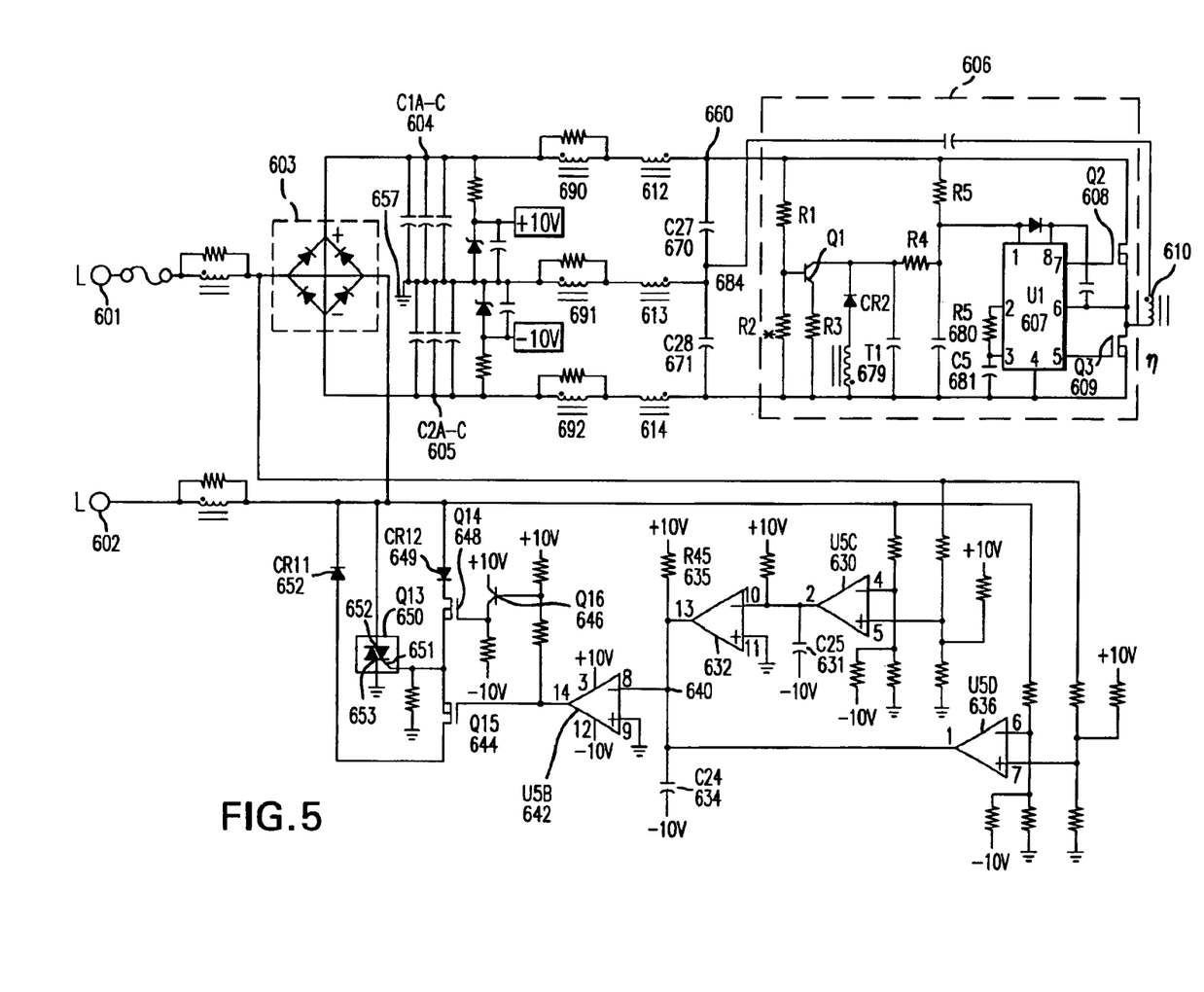
FIG. 5 illustrates a schematic of a noise cancellation circuit and a triac-enabled multiplying circuit in an AC to DC power supply according to an embodiment of the present invention.

FIG. 5 illustrates a schematic of the noise cancellation circuit and triac-enabled multiplying circuit in an AC to DC power supply according to an embodiment of the present invention. The schematic only illustrates the noise cancellation circuit and the triac-enabled multiplying circuit. The AC to DC power supply operation excluding the noise cancellation circuit and the triac-enabled multiplying circuit is described previously in regards to FIG. 1 and is not illustrated in FIG. 5.

An AC input voltage is received at the input terminals 601 and 602. The AC input voltage is input to the bridge rectifier 603 and a DC voltage is output from the bridge rectifier 603. If the AC input voltage is not within a doubling range, the DC voltage is impressed across the capacitor bank formed by capacitors C1 604, C2 605, C27 670, and C28 671 which are connected in series with the DC voltage. If there is no doubling, the DC voltage may maintain its value. The DC voltage is input to the switching device 606.

The set of inductors 690, 691, and 692 are utilized along with the capacitors C1A—C 604, C2A—C 605, C27 670, and C28 671 to form a differential mode filter for minimizing differential noise. The combination of the inductors 690, 691, and 692 and the capacitors C1A—C 604, C2A—C 605, C27 670, and C28 671 may be referred to as a pie filter and is well know to minimize or eliminate differential noise.

The switching device 606 may include a driving device U1 607 and two field effect transistors (FETs) Q2 608 and Q3 609. The switching device 606 may receive the DC voltage and create a switched output, as discussed with regards to FIGS. 1 and 3. A capacitor CS 681 and a resistor R5 680 may be coupled to the driving device 607 to determine a duty cycle for the FETs Q2 608 and Q3 609. The resistors R1, R2, R3, and Q1 are used to detect an undervoltage condition and to lock down the driving device 607 in case of the undervoltage condition. The bias power for transistor Q1 is provided by windings T1 679 and diode CR2. Resistor R5 is loaded by the Q1 in combination with R3 if the undervoltage condition is realized and this places the driving device 607 in an undervoltage lockdown condition.

The switched output may be received across the primary winding 610 of a transformer (not shown) and the switched output may be transferred to the first secondary winding (not shown). The switching device 606 may create a common mode noise waveform. Due to the parasitic capacitance inherent in the transformer 612, the common mode noise waveform is capacitively coupled from the primary winding 610 of the transformer 612 to the first secondary winding of the transformer, as discussed above with regards to FIGS. 1 and 3. The transmission of the common mode noise waveform through the capacitor may present problems for any device connected to the AC to DC power supply.

In an embodiment of the invention, a first terminal of the set of cancellation secondary windings 612, 613, and 614 may be coupled to a set of inductors 690, 691, and 692, respectively. A second terminal of the cancellation secondary winding 612 may be coupled to a first terminal of capacitor C27 670. A second terminal of the cancellation secondary winding 613 may be coupled to node 684, which is defined by the junction of a second terminal of C27 670 and a first terminal of capacitor C28 671. A second terminal of the cancellation secondary winding 614 may be coupled to the capacitor C28 671.

As discussed previously, the set of cancellation secondary windings 612, 613, and 614 introduce a common mode cancellation waveform to cancel out the common mode noise waveform. The number of turns in each of the set of cancellation secondary windings 612, 613, and 614 may be the same. As discussed previously, the introduction of a turns reducing capacitor (not shown) may reduce the number of turns in each of the set of cancellation secondary windings 612, 613, and 614. In this embodiment of the invention, the turns reducing capacitor is not utilized and thus the number of turns of each of the set of cancellation secondary windings 612, 613, and 614 is equal to the turns of the primary winding 610 of the transformer, i.e., the number of turns for both is four. This will enable the introduction of a common mode cancellation waveform at the set of cancellation secondary windings 612, 613, and 614 that is equal in magnitude to the common mode noise waveform. The common mode cancellation waveform is opposite in phase to the common mode noise waveform and cancels out the common mode noise waveform.

FIG. 5 also illustrates a detailed schematic of a triac-enabled multiplying circuit according to an embodiment of the present invention. In the embodiment illustrated in FIG. 5, the triac-enabled multiplying circuit is a triac-enabled doubling circuit. The AC input is monitored by a low threshold comparator U5C 630. The comparator U5C 630 is only sampling the positive cycle of the AC waveform. If the AC input is above the nominal voltage established by the comparator U5C 630, the comparator U5C 630 transmits a high signal. The high signal discharges the capacitor C25 631 on each repetitive peak of the AC input. The comparator U5A 632 produces a high signal at its output. The high signal charges the capacitor C24 634. The combination of the resistor R45 635 with the capacitor C24 634 forms an integrator that verifies that the AC input is above the nominal voltage for a specified period of time. If the AC input is below a nominal voltage, a low signal is transmitted from the comparator U5C 630 and the capacitor C25 631 is charged. In an embodiment of the invention, C25 is charged by −10 volts. A low signal transmitted from comparator U5C 630 may result in a low being transmitted out of U5A 632. A low being transmitted out of U5A 632 inhibits the capacitor C24 634 from charging.

Illustratively, the triac-enabled doubling circuit also monitors the high peak value of the AC input. The AC input is monitored by a high threshold comparator U5D 636. The high threshold comparator U5D 636 is sampling only the positive cycle of the AC input. If the AC input is below a nominal voltage established by the high threshold comparator U5D 636, the comparator U5D 636 transmits a high signal and enables the charging of capacitor C24 634. Again, the combination of resistor R45 635 with capacitor C24 634 verifies that the high peak value of the AC input is below the nominal voltage established by the high threshold comparator U5D 636 for a certain number of time periods. If the AC input is below a nominal voltage established by the high threshold comparator U5D 636, the comparator U5D 636 is open and inhibits the charging of capacitor C24 634.

The charging of capacitor C24 634 drives the voltage at node 640 to zero. Node 640 is formed by the junction of the resistor R45 635, the capacitor C24 634, and the output of comparator U5A 632. The threshold detector U5B 642 receives the voltage through node 640 and when the voltage reaches a threshold value, e.g., 0 volts, a threshold signal is transmitted from the threshold detector U5B 642. For example, when U5B 642 hits the threshold voltage, e.g., 0 volts, it drives −10 volts to Q15 644. Q15 644 may be a p-channel field effect transistor (FET). U5B 642 may also drive a signal through inverter Q16 646 to Q14 648. The inversion of the signal by the inverter 646 places +10 volts on Q14 648. Q14 648 may be an n-channel FET. Thus, the signal originally transmitted by the threshold detector 642 turns on transistors Q15 644 and Q14 648.

On the positive side of the cycle, the AC current passes through CR12 649, and through FET Q14 648 to a gate terminal 651 of the triac Q13 650. On the negative half of the cycle, the AC current passes through CR11 652 and through FET Q15 644 to fire the triac Q13 650 in the negative quadrant. The triac Q13 650 acts as a switch to connect the AC line, input via the first anode 652, to the capacitor bank formed by capacitors C1A—C 604, C2A—C 605, C27 670, and C28 671. As the FETs Q14 648 and Q15 644 drive current through the gate terminal 651 to the triac Q13 650, the triac is enabled. A first anode 652 of the triac Q13 650 is coupled to a terminal on the AC line. A second anode 653 of the triac 650 is coupled to ground. Ground is also coupled to the center tap 657 of the capacitor bank formed by capacitors C1A—C 604, C2A—C 605, C27 670, and C28 671, and this is how the current is transferred to the capacitor bank. In other words, the sinusoid waveform of the AC voltage is transferred from the first anode 652 of the triac Q13 650 to the second anode 653 of the triac Q13 650 and to node 657 of the capacitor bank formed by C1A—C 604, C2A—C 605, C27 670, and C28 671. On the positive cycle of the AC sinusoid waveform, the top part of the capacitor bank, i.e., C1A—C 604 and C27 670 is charged to the DC input voltage. On the negative cycle of the AC sinusoid waveform, the bottom part of the capacitor bank C2A—C 605 and C28 671 is charged to the DC input voltage. Thus, the doubled DC voltage present at node 660 is equivalent to approximately two times the DC voltage.

An AC to DC power supply may include a noise cancellation circuit. The noise cancellation circuit of the invention introduces a common mode cancellation waveform which cancels out a common mode noise waveform generated by the high frequency switching device. This is important in the AC to DC power supply because it prevents the transformer from transmitting large common mode noise waveforms to devices attached or coupled to the power supply. The power supply also includes a low-loss, low noise doubling circuit that utilizes a triac, which is powered by the AC line, to enable the doubling of the DC voltage under specific operating conditions.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A common mode noise cancellation circuit, comprising:
    one or more switching devices to receive a DC voltage and to produce a switched output; and
    a transformer including a primary winding and a first secondary winding; and
    a set of cancellation secondary windings that introduce a common mode cancellation waveform, wherein the set of cancellation secondary windings are wired in a common mode configuration and the common mode cancellation waveform is opposite in phase to a common mode noise waveform generated by the one or more switching devices.

2. The common mode noise cancellation circuit of claim 1, further including a capacitor coupled between the first secondary winding and the one or more switching devices to control the amplitude of the common mode noise waveform to reduce a number of turns necessary in the set of cancellation secondary windings.

3. The common mode noise cancellation circuit of claim 1, wherein the set of cancellation secondary windings are located on a primary side of the transformer and are coupled to the DC voltage input.

4. The common mode noise cancellation circuit of claim 1, wherein the set of cancellation secondary windings are located on the secondary side of the transformer.

5. A common mode noise cancellation circuit of claim 1, further including a DC input source to provide the DC voltage a.

6. A common mode noise cancellation circuit of claim 1, further including an AC input source and a rectifier to provide the DC voltage.

7. A low-loss, low-noise triac-enabled multiplying circuit, comprising:
    a triac control circuit to receive an AC input, to determine whether the AC input is higher than a low threshold voltage and lower than a high threshold voltage, and to transmit a DC firing signal if the AC input is higher than a low threshold voltage and lower than a high threshold voltage; and
    a triac circuit to receive the DC firing signal at a gate terminal of a triac, to source a triac current from the AC input via a triac anode, and to be enabled when zero voltage is present across the triac to reduce electromagnetic interference (EMI) noise.

8. The triac-enabled multiplying circuit of claim 7, wherein the triac control circuit further includes:
    a low-side voltage sense circuit to receive the AC input to determine if the AC input is above the low threshold voltage, and to output a low activation signal if the AC input voltage is above the low threshold voltage; and
    a high-side voltage sense circuit to receive the AC input voltage, to determine if the AC input voltage is below the high threshold voltage, and to output a high activation signal if the external signal is below the high threshold voltage.

9. The triac-enabled multiplying circuit of claim 8, wherein the triac control circuit further includes an integrator to verify that the low activation signal is active and the high activation signal is active for a number of periods and to output an intermediate signal.

10. The triac-enabled multiplying circuit of claim 9, wherein the triac control circuit further includes a comparator to receive the intermediate signal and to output a triac fire signal when a threshold voltage is met in the comparator.

11. The triac-enabled multiplying circuit of claim 7, wherein the triac-enabled multiplying circuit is a triac-enabled doubling circuit and a DC input is doubled.

12. An AC to DC power supply including:
   a triac-enabled multiplying circuit to receive a DC voltage and to create a multiplied DC voltage if an AC input voltage has a value between a low threshold voltage and a high threshold voltage;
   one or more switching devices to receive either the multiplied DC voltage from the triac-enabled doubling circuit or the DC input voltage, if the AC input voltage does not have a value between the low threshold voltage and the high threshold voltage, and to produce a switched output;
   a transformer including a primary winding, a first secondary winding, and a set of cancellation secondary windings to receive the switched output, generate a transformed output, and to generate a common mode noise waveform; and
   a regulating device to receive the transformed output and to generate a regulated output voltage, wherein
   the set of cancellation secondary winding are wired in a common mode configuration and introduce a common mode cancellation waveform that is opposite in phase to the common mode noise waveform.

13. The power supply of claim 12, further including a capacitor coupled between the first secondary winding and the one or more switching devices to control the amplitude of the common mode noise waveform to reduce a number of turns necessary in the set of cancellation secondary windings.

14. The power supply of claim 12, wherein the triac-enabled multiplying circuit is a triac-enabled doubling circuit and the DC input voltage is doubled.

15. The power supply of claim 12, wherein the set of cancellation secondary windings are placed on the primary side of the transformer.

16. The power supply of claim 12, wherein the set of cancellation secondary windings are placed on the secondary side of the transformer.

17. The power supply of claim 12, wherein the triac-enabled multiplying circuit includes a triac control circuit to receive the AC input voltage, to determine whether the AC input voltage is higher than a low threshold voltage and lower than a high threshold voltage, and to transmit a DC firing signal if the AC input voltage is higher than a low threshold voltage and lower than a high threshold voltage; and
   a triac circuit to receive the DC firing signal at a gate terminal of a triac, to source a triac current from the AC input via a triac anode, and to be enabled when zero voltage is present across the triac to reduce electromagnetic interference (EMI) noise.

18. A method to cancel common mode noise, comprising:
   generating a common mode noise waveform from one or more switching devices;
   transmitting the common mode noise waveform to a transformer in a circuit;
   creating a common mode cancellation waveform by the introduction of a set of cancellation secondary windings into the circuit to cancel out the common mode noise waveform, the cancellation common mode noise waveform being equal in amplitude to the common mode noise waveform but opposite in phase.

19. The method of claim 18, further including reducing a number of turns of for each of the set of cancellation secondary windings by coupling a capacitor between the first secondary winding and the one or more switching devices.

20. A method of multiplying a DC voltage, comprising:
   receiving, at a triac control circuit, an AC input voltage;
   determining whether the AC input voltage is above a low threshold voltage and below a high threshold voltage;
   transmitting a DC triac fire signal to a gate terminal of a triac if the AC input is above the low threshold voltage and below the high threshold voltage; and
   enabling the triac when the voltage across the triac is at zero volts to charge a capacitor bank which results in multiplying of the DC voltage.

21. The method of claim 20, wherein enabling the triac includes connecting a first anode of the triac, which is coupled to AC input, to a second anode of the triac, which is coupled to a reference potential.

22. The method of claim 21, wherein a center node of the capacitor bank is also coupled to the reference potential, which results in the center node of the capacitor bank being coupled to the AC input and capacitors of the capacitor bank being charged to multiply the DC voltage.

23. The method of claim 20, wherein the multiplying of the DC voltage is a doubling of the DC voltage.

* * * * *